United States Patent [19]

Feller et al.

[11] Patent Number: 5,025,698
[45] Date of Patent: Jun. 25, 1991

[54] APPARATUS FOR MEASURING LIP PRESSURE ON REED OF WOODWIND INSTRUMENTS

[76] Inventors: David E. Feller, 209 E. 1400 South, Bountiful, Utah 84010; Carl G. Wood, 780 Nancy Dr., South Ogden, Utah 84408

[21] Appl. No.: 504,916

[22] Filed: Apr. 2, 1990

[51] Int. Cl.$^5$ .................... G10G 3/00; G01D 21/00
[52] U.S. Cl. .................................. 84/453; 73/651
[58] Field of Search ............... 73/651, 862.54, 862.64; 128/777; 84/453

[56] References Cited

U.S. PATENT DOCUMENTS 4,779,465  10/1988  Stearns et al. ................ 73/862.54

Primary Examiner—L. T. Hix
Assistant Examiner—Jae N. Noh

[57] ABSTRACT

An apparatus which measures the deflection of a single or double reed of a woodwind musical instrument. A strain measuring transducer affixed to the reed measures the amount of pressure applied by the players lip or lips to said reed. In the preferred embodiment, the signal indicative of the deflection is delivered to the bridge completion circuit. This circuit is amplified by the high gain amplifier to a level that can be read by the adjustable peak level indicator or viewed on a readout meter. A method whereby musicians are provided with an indication of lip pressure for comparison and analysis. The signal can also be viewed on a time based voltage recorder or spectrum analyzer for quantitative lip pressure effects as well as timbre characteristics of different mouthpieces, reeds, ligatures and instruments.

3 Claims, 1 Drawing Sheet

APPARATUS FOR MEASURING LIP PRESSURE ON REED OF WOODWIND INSTRUMENTS

BACKGROUND OF THE INVENTION

This invention relates to a method and apparatus which assists in training a woodwind musical instrument player. The application of the apparatus includes musical instruments requiring a reed. Such instruments are those of the clarinet, saxophone, oboe, and bassoon families. Instruments of the brass family, which do not require a reed, are excluded. This technique also finds productive application in characterizing and quantifying the vibration and tonal qualities of reeds, ligatures, mouthpieces, and instruments.

In such woodwind instruments, the player must place his lip or lips directly against the reed in order to produce a sound. The amount of lip pressure is an essential factor in the production of tone, timbre, and intonation. Too much or too little pressure will result in inferior quality. Consequently, woodwind players spend years developing the proper feel on a trial-and-error basis. Accordingly, the question is how much pressure is required to achieve proper tone, timbre, and intonation. This is something that can be discussed by a music teacher with a beginner but is not easily transferred. As an example, most beginning clarinetists do not apply enough lip pressure to the reed therefore resulting in inferior sound and pitch. The beginning student develops improper playing habits because of a misunderstanding related to lip pressure. Much of a beginners success depends on how quickly this "feel" is developed. Unfortunately, there has been no systematic method for measuring lip pressure on a reed. Moreover, construction and design of mouthpieces, ligatures, and reeds primarily has been relegated to a trail-and-error basis according to a desired aural response or outcome. Manufactures have found no standardized means to isolate and quantify the vibration and tonal qualities of reeds, ligatures, and mouthpieces. Consequently, the average clarinetists or saxophonists, for example, spends considerable time and money testing different reeds, ligatures, and mouthpieces according to recommendation or on a trail-and-error basis.

SUMMARY OF THE INVENTION

The present invention is directed to a method and apparatus for measuring and providing information to a woodwind player of a reed instrument to change and develop his sound and technique. Moreover, this method and apparatus finds productive application in characterizing the vibration and tonal qualities of reeds, ligatures, mouthpieces, and instruments.

In accordance with the invention described herein, a strain measuring transducer is affixed to the reed of a woodwind musical instrument. When pressure is applied to the reed from the players lip or lips, a deflection occurs which is measured by the strain measuring transducer and transmitted through signal wires. The output is amplified and connected to a peak level indicator which is calibrated by the student or the instructor. The output can also be connected to a readout meter, spectrum analyzer, or time based analyzer to measure the vibration characteristics of the reed, mouthpiece, ligature, and instrument.

Further objects and advantages of our invention will become apparent from a consideration of the drawings and ensuing description thereof.

BRIEF DESCRIPTION OF THE DRAWINGS

The invention will be hereinafter more fully described with reference to the accompanying drawings which include.

It is to be noted that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
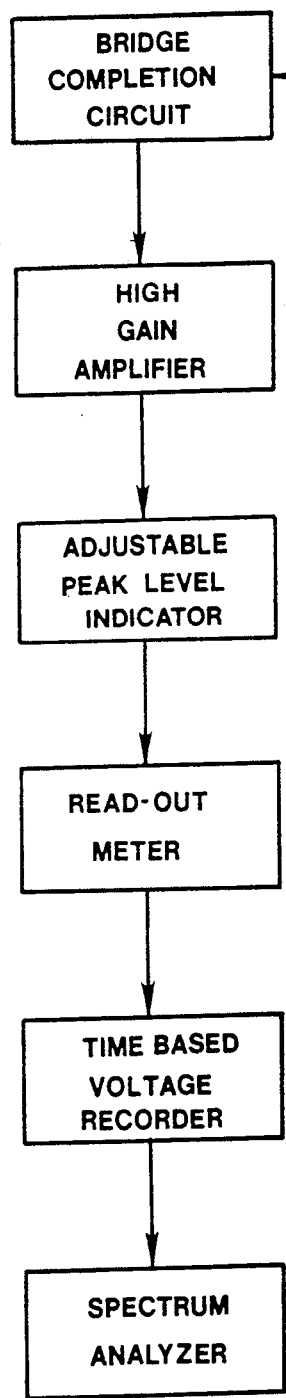
FIG. 1 is a top plan view of a mouthpiece, reed, and ligature showing the strain measuring transducer affixed to the reed and signal wires leading to the amplifier.
Figure 1:
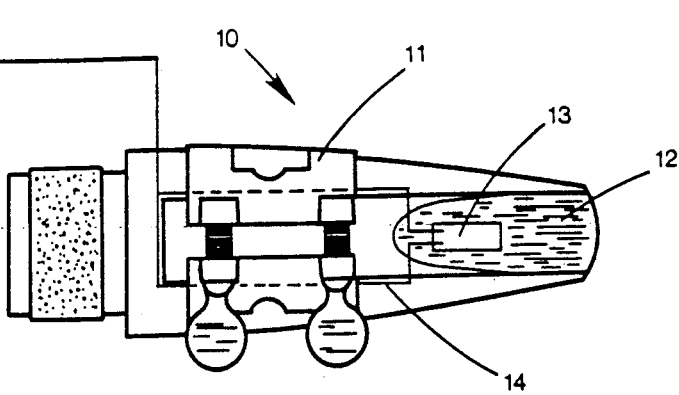

Referring to FIG. 1 of the drawings, reference numeral 10 illustrates an example of a top view of a typical mouthpiece for a reed musical wind instrument, comprising a ligature 11, and a reed 12. A strain measuring transducer 13 is affixed to the reed 12. Signal wires 14 are affixed to the strain measuring transducer 13. This is used to measure the deflection of the reed 12 according to the amount of lip pressure applied by the player and will be described in detail hereafter. The signal wires 14 are secured along the sides of the reed so as not to impede the ligature 11.

Figure 2:
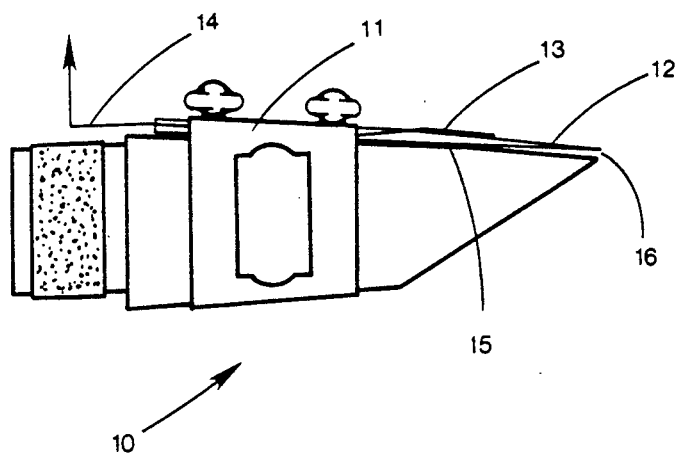
FIG. 2 is a side view showing a mouthpiece, reed, and ligature with strain measuring transducer affixed at the fulcrum that the reed bends across during play. Lip pressure causes the reed to deflect which deflection is measured by the strain measuring transducer and the signal is delivered through signal wires to readout circuitry.

FIG. 2 shows strain measuring transducer 13 affixed to reed 12 at the fulcrum where the reed bends across 15. The deflection, which occurs when pressure is applied by the musician to the reed 12, narrows the gap 16 between the mouthpiece 10 and reed 12 and is measured by the strain measuring transducer 13. The signal is transmitted through the signal wires 14 to the bridge completion circuit 17. The bridge completion circuit 17 is a four-arm wheatstone bridge with an excitation voltage of 1.5 volts. The output of the bridge completion circuit 17 is amplified by the high gain amplifier 18 to a level that can be read by the adjustable peak level indicator 19. The output of the peak level indicator 19 is a light emitting diode or series of diodes that light when the correct lip pressure is applied to the reed 13. The signal from the high gain amplifier 18 can also be viewed on a readout meter 20, a time based voltage recorder 21, or a spectrum analyzer 22.

The purpose of the adjustable peak level indicator 19 is to provide a correct/non-correct indication of lip pressure to beginning woodwind instrument players. The readout meter 20 gives a continuous indication of lip pressure for more advanced players so that they may judge the relative effects of lip pressure in various aspects of performance. The time based voltage recorder 21 and the spectrum analyzer 22 give quantitative readings of the effects of lip pressure on the reed vibration characteristics. From this, the advanced or professional player as well as woodwind manufacturers and researchers can quantify lip pressure effects and measure the timbre characteristics of different mouthpieces, reeds, ligatures, and instruments.

Thus, the invention heretofore described is a new, novel and unique method to measure woodwind lip pressure. While the invention has been described with reference to the preferred embodiment, it would be obvious to one skilled in the art that modification and variations of the invention may be constructed and employed without departing from the scope of the invention. All charges which come within the meaning and range of equivalency of the claim are, therefore, intended to be embraced therein.

We claim:

1. An apparatus for measuring lip pressure applied by a musician on a reed of a musical instrument comprising:

(a) a strain measuring transducer;

(b) attachment means for attaching said strain measuring transducer to said reed of said musical instrument; and (c) signal means coupled to said strain measuring transducer for providing a signal corresponding to strain measured by said strain measuring transducer that is a function of said lip pressure applied by said musician on said reed.

2. The apparatus defined in claim 1 wherein said strain measuring transducer further comprises deflection measuring means for measuring deflection of said reed.

3. A method for measuring lip pressure applied to a reed of a musical instrument comprising the steps of:

(a) obtaining a strain measuring transducer;

(b) mounting said strain measuring transducer to said reed of said musical instrument;

(c) applying said lip pressure to said reed of said musical instrument; and (d) measuring said lip pressure with said strain measuring transducer.

* * * * *